Patented June 19, 1945

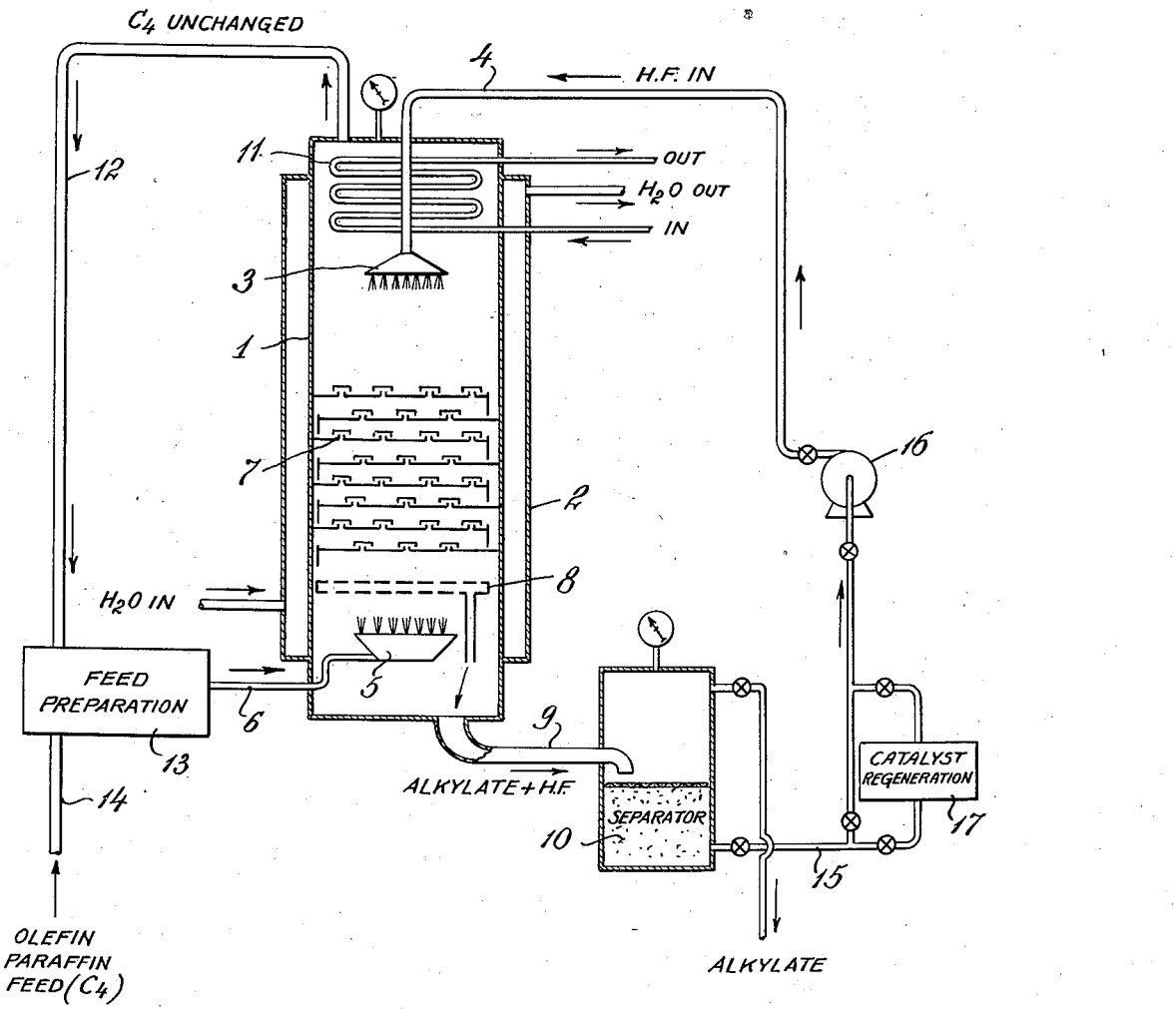

2,378,439

UNITED STATES PATENT OFFICE 2,378,439

HYDROCARBON SYNTHESIS

Carleton H. Schlesman, Camden, N. J., assignor to Socony-Vacuum Oil Company, Incorporated, a corporation of New York Application June 25, 1943, Serial No. 492,222

7 Claims. (Cl. 260—683.4)

This invention relates to synthesis of valuable hydrocarbons by condensation of hydrocarbon reactants in the presence of a liquid acid catalyst to obtain hydrocarbon products of higher molecular weight than the charge hydrocarbons. Important among such reactions are alkylation of paraffins, particularly isoparaffins, with olefins and polymerization of olefins. Typical catalysts are hydrogen fluoride, sulfuric acid and phosphoric acid. The effect of various liquid acid catalysts in such reactions has received considerable attention and the effects of temperature control have also been studied. It is the general belief in the art that reactions of this type require rather close temperature control in order to obtain the desired selectivity of reaction. For the most part, the exercise of temperature control involves abstraction of heat generated by the reaction. It has been the practice to control reaction temperatures by control of the temperature of material supplied as feed stock and catalyst as well as by abstraction of heat from the reaction mass itself.

A further common characteristic of processes of the above class has been the practice of obtaining the desired intimate contact by violent agitation of a two-phase liquid system. Very expensive "contactors" having high power requirements for agitation of the liquid mass are conventional equipment. The present invention provides means for obtaining proper contact between reactants and catalyst without agitation of the reaction mass. The invention is also adapted to take advantage of the very marked advantages in nature and course of the reaction obtained by preheating the reactants charged to the system. This is the concept described in the prior copending application Serial No. 490,487, filed by Arlie A. O'Kelly and Jacob R. Meadow on June 11, 1943.

The invention contemplates briefly the charging of the feed stock in vapor phase to the lower part of a vertical reaction zone and supplying the liquid acid catalyst to the upper part of the reaction zone in liquid phase as a fine spray. It is apparent that the invention is adapted to use in those condensation reactions where the charge stock (reactants) has a lower boiling range than the liquid catalyst. The temperature of the reaction zone is maintained at a point intermediate the boiling point of the catalyst and that of the reactants. Preferably, means are interposed between the points of reactant and catalyst introduction to promote contact between the two phases, for example, an inert packing material or bubble trays. The unreacted hydrocarbons are withdrawn from the top of the reaction zone, while the catalyst collects in the bottom of the reaction zone and is withdrawn from there. The conditions in the reaction zone may be such as to cause condensation of the high boiling product for withdrawal with the catalyst or to permit the product to be removed in vapor phase with unreacted hydrocarbons. Usually, the first alternative is preferred because of the greater ease of separating the product from the catalyst. Generally, simple decantation suffices to separate catalyst and crude product, while separation of product from unreacted hydrocarbon involves fractional distillation.

The nature of the invention can be further understood from consideration of a preferred embodiment thereof illustrated in the attached drawing, the single figure of which represents, diagrammatically, suitable apparatus embodying the novel concept of the invention. The reaction chamber 1 is essentially a vertical tower surrounded by a heat exchange jacket 2 for circulation of cooling water in indirect heat exchange relationship with the reaction zone in chamber 1. Means are provided near the top of the reaction zone to introduce liquid acid catalyst as a fine spray, such as the spray head 3 supplied by pipe 4. A distributor 5 injects the hydrocarbon charge in vapor phase from pipe 6 across a substantial area in the lower portion of the reaction zone.

According to the embodiment shown, an intermediate portion of the reaction zone is equipped with a plurality of bubble trays indicated generally at 7. The lowermost tray 8 acts as a collector to divert liquid products to an outlet pipe 9 leading to a settler 10 wherein product is separated from the liquid acid catalyst. Above the spray 3 is a trimming coil 11, through which water is circulated to condense higher boiling material constituting part of the product, the unreacted hydrocarbons being withdrawn by pipe 12 for return to the process.

The unreacted hydrocarbons in pipe 12 are passed to a feed preparation unit 13 where they are mixed with fresh feed for the process from pipe 14 and preferably preheated to a temperature substantially above that prevailing in the reaction zone. Any substantial degree of preheat apparently gives advantages in the process more than compensating for the increased load placed thereby on the refrigeration equipment, but preheat temperatures of at least 100° F. in excess of reaction temperature are preferred.

Catalyst separated from crude product in settler 10 is passed by pipe 15 for return to spray head 3 by means of pump 16. If the condition of the catalyst renders regeneration desirable, a part or all of the catalyst may be passed through a catalyst regeneration unit 17, which is of conventional design and includes means for discarding a portion of spent catalyst and/or injecting fresh catalyst, if desirable.

In a typical operation involving use of the apparatus illustrated, isobutane is alkylated with mixed butenes in the presence of hydrogen fluoride. This is the process indicated by the legends applied to the drawing. Recycled isobutane from pipe 12 is mixed with fresh isobutane and mixed butenes from pipe 14 and preheated to about 200° F. in feed preparation unit 13. The charge is then atomized into the bottom of chamber 8 which is maintained at about 50° to 100° F. by circulation of cooling water through jacket 2. Liquid hydrogen fluoride is supplied by spray head 3. The product separated in settler 10 is unusually low in fluorides and includes a yield of 80 to 90% or better of alkylate boiling in the aviation gasoline range based on olefin consumed.

The invention is also adapted to such operations as hot sulfuric acid polymerization of isobutylene to give large yields of iso-octane. Temperatures on the order of 140 F. are maintained in the reaction zone and the acid is supplied at about that temperature, while isobutylene charge is passed in as a vapor at about 200° F.

I claim:

1. In a process for synthesizing valuable hydrocarbon products by reaction of isoparaffins and olefins in the presence of hydrogen fluoride, the improvement which comprises maintaining a reaction zone at a temperature of about 50° to 100° F., introducing liquid hydrogen fluoride to the upper part of said zone as a spray, withdrawing liquid hydrogen fluoride from the bottom of said zone, introducing a mixture of olefins and isoparaffins to the lower part of said zone as vapor at a temperature at least about 100° F. greater than the temperature in said zone and passing said vapor upwardly through said zone in intimate contact with said hydrogen fluoride, withdrawing hydrocarbon product from the bottom of said zone and withdrawing unreacted hydrocarbons from the top of said zone.

2. In a process for synthesizing valuable hydrocarbon products by reaction of isobutane and butene in the presence of hydrogen fluoride, the improvement which comprises maintaining a reaction zone at a temperature of about 50° to 100° F., introducing a mixture of isobutane and butene to said zone in vapor phase at a temperature substantially greater than that prevailing in said zone, introducing liquid hydrogen fluoride to said zone and effecting intimate contact thereof with said isobutane and butene, withdrawing liquid hydrocarbon product from said zone and separately withdrawing unreacted hydrocarbons from said zone; whereby hydrocarbon products are removed from said reaction zone substantially free of unreacted lower boiling hydrocarbons.

3. In a process for synthesizing valuable hydrocarbon products by exothermic interaction of hydrocarbon reactants of lower boiling point than the desired products in the presence of a liquid acid catalyst; the steps which comprise maintaining a reaction zone at a temperature substantially above the boiling points of said hydrocarbon reactants and substantially below the boiling points of said hydrocarbon products, introducing said hydrocarbon reactants to the lower portion of said zone in vapor phase at a temperature substantially above the said temperature maintained in said reaction zone, introducing said liquid acid catalyst to the upper portion of said zone, inducing intimate countercurrent contact of said catalyst and said reactants in a region of said zone intermediate the respective points of introduction of said catalyst and said reactants, removing liquid hydrocarbon products from a point below said region of contact, removing vaporous unreacted hydrocarbon reactants from a point above said region of contact and abstracting heat from said region of contact; whereby hydrocarbon products are recovered substantially free of unreacted hydrocarbons and the heat exchange load required for cooling the region of contact is greatly decreased by failure to condense unreacted hydrocarbons while taking full advantage of the benefits of introducing reactants as superheated vapor.

4. In a process for synthesizing valuable hydrocarbon products by exothermic interaction of isoparaffins and gaseous olefins in the presence of a liquid acid catalyst which will induce alkylation; the steps which comprise maintaining a reaction zone at a temperature substantially above the boiling points of said isoparaffins and olefins and substantially below the boiling points of the desired hydrocarbon products, introducing a mixture of said isoparaffins and said olefins to the lower portion of said zone in vapor phase at a temperature substantially above the said temperature maintained in said reaction zone, said isoparaffins being present in substantial excess above that required for reaction with said olefins, introducing said liquid acid catalyst to the upper portion of said zone, inducing intimate countercurrent contact of said catalyst and said reactants in a region of said zone intermediate the respective points of introduction of said catalyst and said reactants, removing liquid hydrocarbon products from a point below said region of contact, removing vaporous unreacted isoparaffins from a point above said region of contact and abstracting heat from said region of contact; whereby hydrocarbon products are recovered substantially free of unreacted isoparaffins and the heat exchange load required for cooling the region of contact is greatly decreased by failure to condense unreacted hydrocarbons while taking full advantage of the benefits of introducing a vaporous superheated mixture of isoparaffins and olefins.

5. The process of claim 4 characterized in that said catalyst is hydrogen fluoride.

6. The process of claim 4, characterized in that said isoparaffin is isobutane, said olefins are butenes and said catalyst is hydrogen fluoride.

7. In a process for synthesizing valuable hydrocarbon products by exothermic interaction of hydrocarbon reactants of lower boiling point than the desired products in the presence of a liquid acid catalyst; the steps which comprise maintaining a reaction zone at a temperature substantially above the boiling points of said hydrocarbon reactants and substantially below the boiling points of said hydrocarbon products, introducing said hydrocarbon reactants to said zone in vapor phase at a temperature substantially above the said temperature maintained in said reaction zone, introducing said liquid acid catalyst to zone, inducing intimate countercurrent contact of said catalyst and said reactants in a region of said zone containing said liquid acid catalyst, removing liquid hydrocarbon products from said region of contact, removing vaporous unreacted hydrocarbon reactants from said region of contact and abstracting heat from said region of contact; whereby hydrocarbon products are recovered substantially free of unreacted hydrocarbons and the heat exchange load required for cooling the region of contact is greatly decreased by failure to condense unreacted hydrocarbons while taking full advantage of the benefits of introducing reactants as superheated vapor.

CARLETON H. SCHLESMAN.